US011530687B2

(12) United States Patent
Barber

(10) Patent No.: US 11,530,687 B2
(45) Date of Patent: Dec. 20, 2022

(54) BELT DRIVEN SYSTEM FOR A WIND TURBINE GENERATOR

(71) Applicant: Gerald L. Barber, Greenville, SC (US)

(72) Inventor: Gerald L. Barber, Greenville, SC (US)

(*) Notice: Subject to any disclaimer, the term of this patent is extended or adjusted under 35 U.S.C. 154(b) by 0 days.

(21) Appl. No.: 17/519,952

(22) Filed: Nov. 5, 2021

(65) Prior Publication Data
US 2022/0056887 A1 Feb. 24, 2022

Related U.S. Application Data

(63) Continuation of application No. 16/671,779, filed on Nov. 1, 2019, now Pat. No. 11,204,019.

(60) Provisional application No. 62/753,956, filed on Nov. 1, 2018.

(51) Int. Cl.
*F03D 15/00* (2016.01)

(52) U.S. Cl.
CPC .................. *F03D 15/00* (2016.05)

(58) Field of Classification Search
CPC .... F03D 15/00; F03D 1/04; F05B 2240/2211; F05B 2240/33; F05B 2260/4021; Y02E 10/72; Y02E 70/30; H02K 7/1004; H02K 7/183
USPC ..................................... 290/44, 55
See application file for complete search history.

(56) References Cited

U.S. PATENT DOCUMENTS

| 1,334,485 A | * | 3/1920 | Clipfell | F03D 7/0224 416/169 R |
| 2007/0015617 A1 | * | 1/2007 | Bertolotti | F03D 9/28 474/85 |
| 2014/0265344 A1 | * | 9/2014 | Barber | F03D 15/20 290/55 |
| 2016/0017867 A1 | | 1/2016 | Tjensvoll | |

FOREIGN PATENT DOCUMENTS

| DE | 3210405 A1 | 9/1983 |
| DE | 20213062 U1 | 11/2002 |
| KR | 20180068325 A | 6/2018 |

OTHER PUBLICATIONS

Supplementary European Search Report for EP19877688.

* cited by examiner

*Primary Examiner* — Julio C. Gonzalez
(74) *Attorney, Agent, or Firm* — Kim and Lahey Law Firm, LLC; Seann P. Lahey; Douglas W. Kim

(57) ABSTRACT

This system includes a belt drive system for a wind turbine generator comprising: a tower having a wind turbine wheel rotatably attached to the tower; a generator platform attached to the tower; a generator supported by the generator platform; and, a turbine drive belt adapted to engaged with the wind turbine wheel and the generator to transfer rotational energy from the wind turbine wheel to the generator to generate electricity.

19 Claims, 8 Drawing Sheets

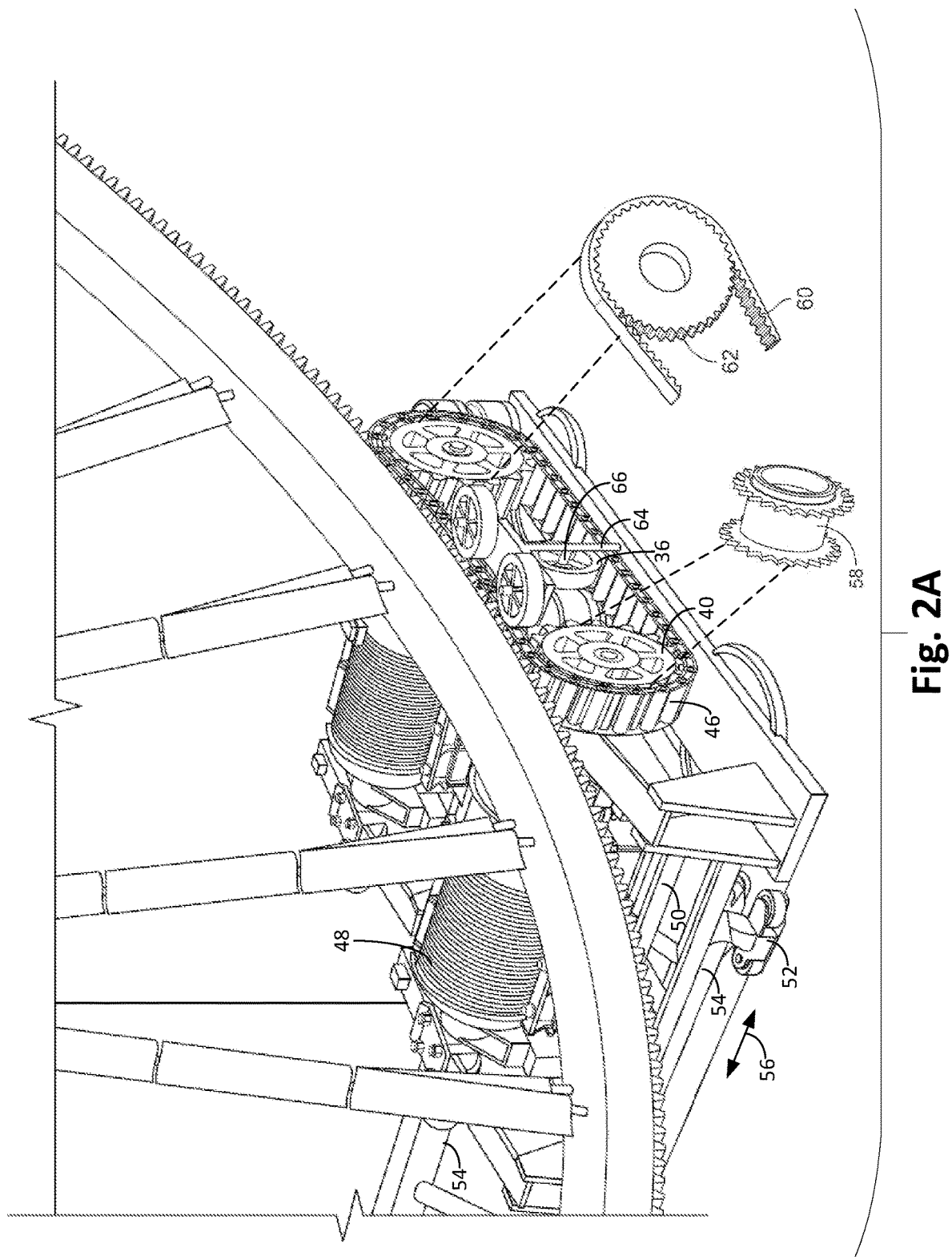

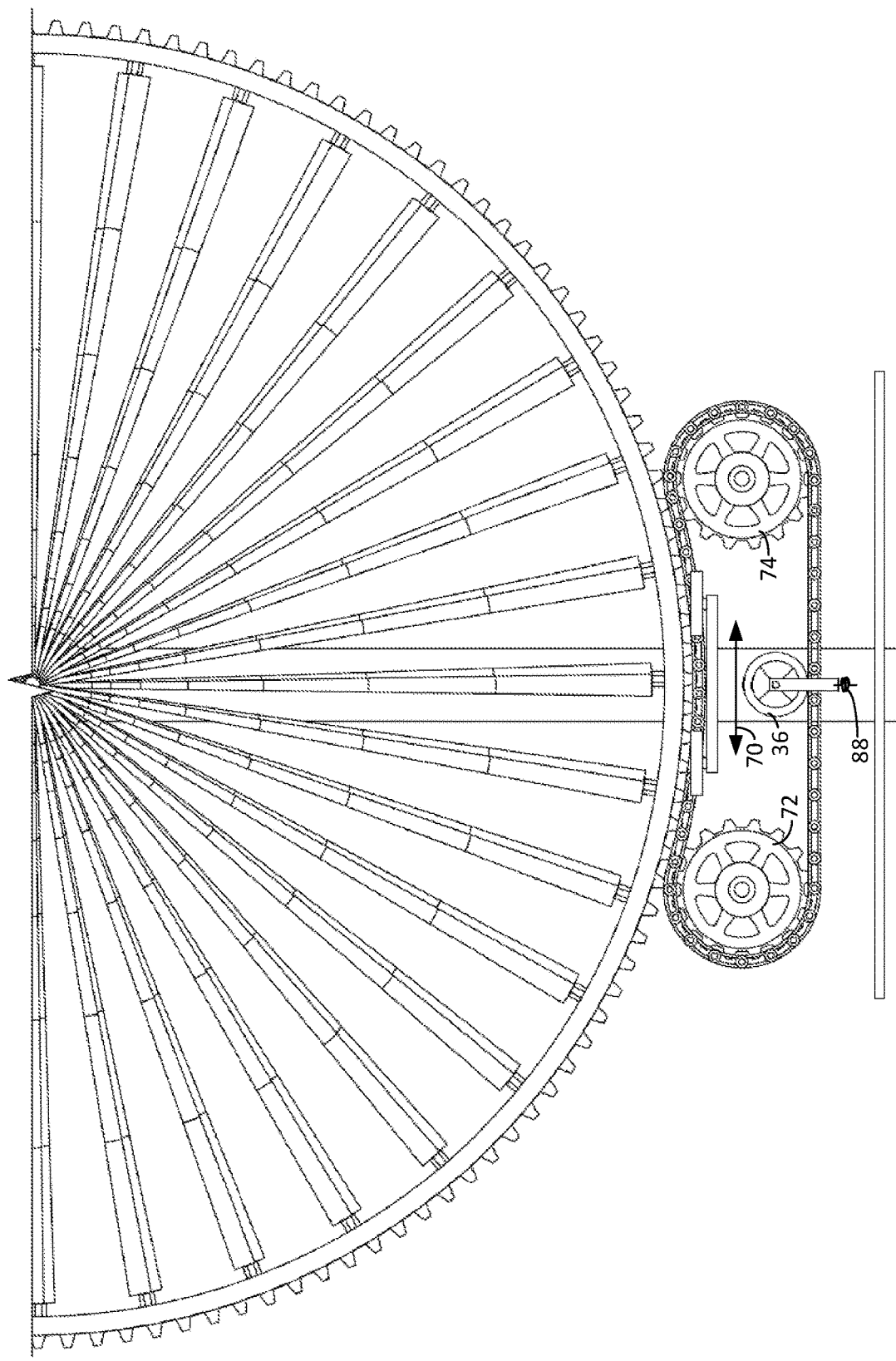

BELT DRIVEN SYSTEM FOR A WIND TURBINE GENERATOR

BACKGROUND OF THE INVENTION

1) Field of the Invention

This invention is directed to a belt driven system for a wind turbine generator.

2) Description of Related Art

Wind-energy development in the U.S. has increased in recent years, especially with a renewed focus on renewable energy. Such designs include the one shown in U.S. Pat. No. 8,196,412 directed to a Floating Wind Turbine with Turbine Anchor by the same inventor herein. One effect of forces, including wind, on these designs is that the perimeter of the wind turbine can become out of vertical plane sue to these forces. Further, offshore wind turbines can be placed on barges and are therefore subject to forces such a rocking, tilting and the like due to the very nature of the barge, tower and wind turbine combination. When the outer rim moves toward or away from the tower, the contact with the generator can be out of alignment which can cause unnecessary wear on the generator, resulting in undesirable forces on the generator, resulting in the turbine wheel slipping off the generator and even system failures.

An early wind wheel electrical generator is disclosed in U.S. Pat. No. 1,233,232. In this reference, a wind wheel comprises a large diameter rotor ring carrying permanent magnets and a center axle which supports the rotor ring by means of radial spokes. Rotation of the rotor ring causes the permanent magnets mounted thereon to move past stationary magnetic cores and the changes of flux value through the cores result in the generation of electrical voltages in windings carried by the cores.

A similar but more recent device is shown in U.S. Pat. No. 6,064,123. Still another device is shown in U.S. Pat. No. 6,664,655. In this reference the wheel comprises a large number of short radial blades fixed between two large-diameter, concentric metal rings. The outer ring is supported for rotation on three outside rollers and the ring can be magnetized to form part of a voltage generator or a motor. United State Patent Application Publication 20190195193 is typical of one of the disadvantages of the industry in that the gear box and/or generator is disposed at the hub of the blades which can be located many feet in the air. This placement of the generator and/or gearbox makes maintenance challenging and even dangerous as the generator and/or gearbox can be hundreds of feet in the air.

One way to provide for an improved wind turbine design without the disadvantages of the central hub design are shown in the following patent applications by the same inventor. U.S. Pat. Nos. 8,109,727, 8,487,471, 7,825,532, 8,258,645, 8,134,251, 8,373,298, 8,174,142, 8,466,577, 9,279,414 and 10,233,904 as well as the following United States Patent Application Publications 20140271183, 20130121832, 20170342966, 20180347224, 20180328334, and 20170175712.

Therefore, it would be advantageous to have a wind turbine that can improve the transfer of rotational force from the wind turbine wheel to a generator.

Therefore, it would be advantageous to have an wind turbine that can account for the perimeter of the wind turbine wheel to maintain registration with the generators.

BRIEF SUMMARY OF THE INVENTION

The above system consists of a belt drive system for a wind turbine generator comprising: a tower; a wind turbine wheel rotatably carried by the tower; a generator platform slidably attached to the tower adapted to allow the generator platform to slide toward and away from the tower; a generator carriage hingeably attached to the generator platform; a generator supported by the generator carriage; a generator shaft attached to the generator; a drive sprocket attached to the generator shaft adapted to cause the generator to produce power when the drive sprocket rotates; a turbine drive belt adapted to engaged with the wind turbine wheel and the drive sprocket to transfer rotational energy from the wind turbine wheel to the drive sprocket to the generator to generate electricity; a generator lift supporting the generator carriage having a raised position and a lowered position wherein in the raised position, the turbine drive belt engages with a perimeter of the wind turbine wheel and wherein in the lowered position, the turbine drive belt does not engage with the perimeter of the wind turbine wheel; a vertical idler adapted to tension the turbine drive belt; and, a horizontal idler adapted to position the turbine drive belt under the wind turbine wheel.

The belt drive system can include teeth disposed along a perimeter of the wind turbine wheel adapted to engage with belt openings defined in the turbine drive belt. The belt drive system can include teeth disposed along a perimeter of the drive turbine belt adapted to engage with wheel openings defined in the wind turbine wheel. The belt drive system can include a rail assembly attached to the tower and slideably attached to the generator platform and adapted to allow the turbine drive belt to move toward or away from the tower in concert with the wind turbine wheel moving out of a vertical plane. The belt drive system can include teeth on an interior side of the turbine drive belt or teeth on an exterior side. An arc can be included in the turbine drive belt.

BRIEF DESCRIPTION OF THE DRAWINGS

The following description of the invention will be better understood by reference to the following drawings that are incorporated and made part of the written specification:

FIG. 2A is a perspective view of aspects of the system;
FIG. 3B is a front view of aspects of the system.

DETAILED DESCRIPTION OF THE INVENTION

The present invention is now described more fully herein with reference to the drawings in which the preferred embodiment of the invention is shown.

Figure 1:
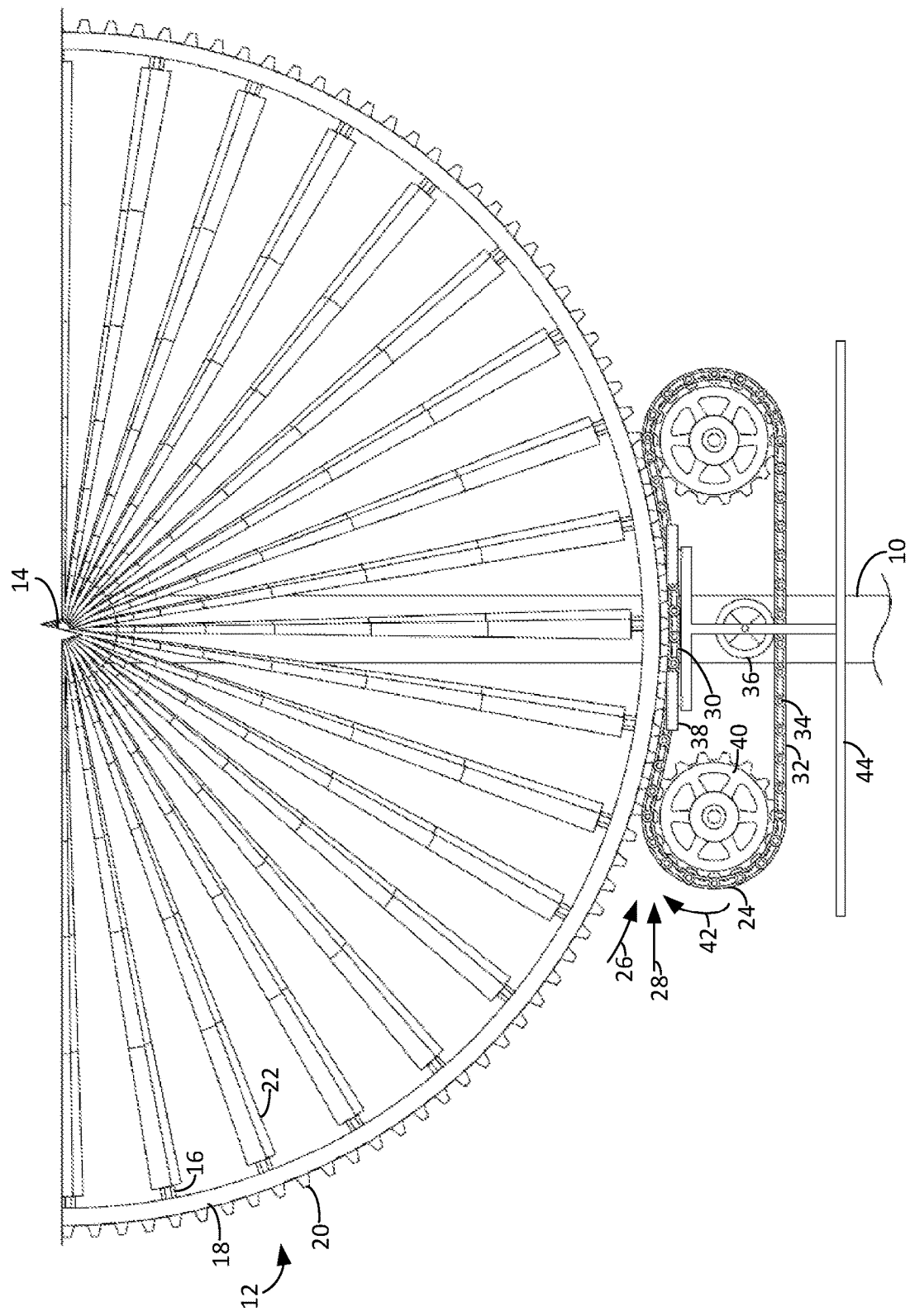
FIG. 1 is a front view of aspects of the system.

Referring to FIG. 1, a tower 10 is shown supporting a wind turbine wheel 12 attached to the tower by a hub 14 (partially shown) configured to allow the wind turbine to rotate about the tower at the hub. Spokes 16 can be attached to the hub at one end and to a perimeter 18 at the other end. The perimeter of the hub can be smooth, include a friction surface or include a plurality of teeth 20 disposed along the outer edge of the perimeter. The friction surface can result in a sliding friction force between the turbine wheel perimeter and a turbine drive belt so that rotational force from the wind turbine wheel is transferred to a generator to produce electricity. The spokes can include sails, blades, air foils 22, or any combination, configured to cause the perimeter to rotate when wind forces act upon the wind turbine.

The teeth can engage with a turbine drive belt 24 that includes opening defined in the belt that receive the teeth so that when the wind turbine wheel rotates in a direction such as 26, the top of the belt is forced in a direction shown as 28. The belt can include an arc 30 to increase the contact surface between the belt and the perimeter. The belt can be continuous or can be a plurality of links 32 connected such as at one or more hinges 34. A vertical idler 36 can be included and in contact with a bottom portion of the turbine drive belt to adapted to apply downward force to place tension on the turbine drive belt to assist in keeping the belt in contact with the perimeter of the wind turbine wheel. Lateral idlers 38 can contact the lateral edge of the belt to maintain alignment of the belt with the perimeter. If the wind turbine perimeter moves toward to away from the tower, the wind turbine wheel belt can remain positioned in line with the wind turbine wheel perimeter. One or more lateral idlers can be included and can be disposed on one or both sides of the belt to assist with keeping the turbine wheel belt in line with the wind turbine perimeter. The lateral idlers can be carried buy the tower or generator support.

A sprocket can be disposed on an interior of the wind turbine belt and engage with the wind turbine belt so that when the wind turbine belt is forced in a direction 28, the sprocket can be turned in a direction 42. The sprocket can be connected to a generator supported by a generator platform 44 attached to the tower so that power is generated when the turbine wheel rotates. The sprocket can also be included in a generator belt assembly allowing multiple sprockets to transfer rotational force from the wind turbine wheel to the generator.

Figure 2B:
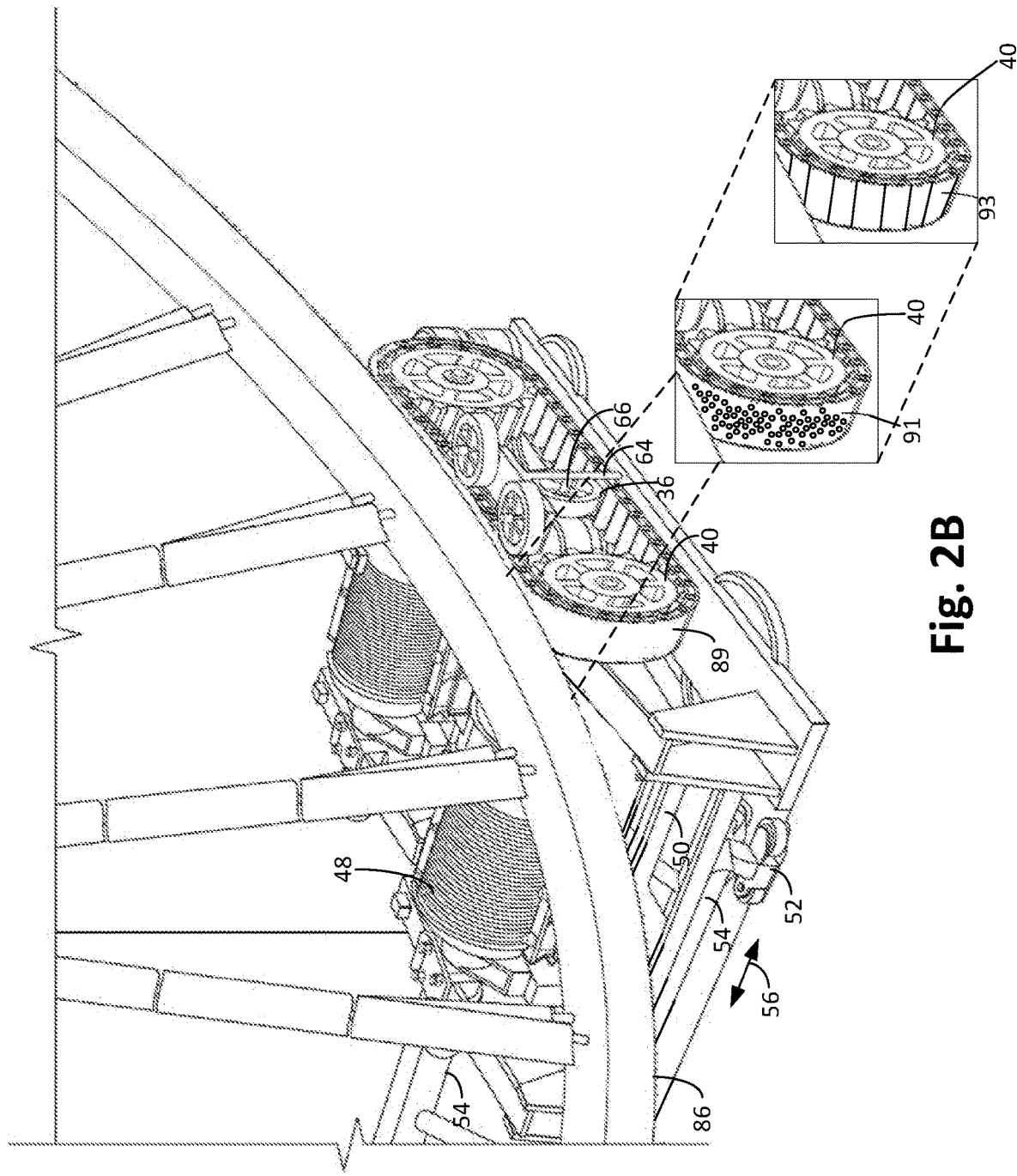
FIG. 2B is a perspective view of aspects of the system.

Referring to FIGS. 2A and 2B, the turbine drive belt can include openings defined in the wind turbine belt 46 for receiving the teeth of the perimeter and the teeth of the sprocket. The generator 48 can be supported by a carriage platform 50 that can include a carriage support. The carriage platform 54 can be supported by a generator carriage 52 that can include rollers allowing the carriage to move in direction 56, toward or away from the tower. When the wind turbine wheel moves in direction 56, the teeth and belt can be cooperatively arranged to allow the carriage to move in direction 56 with the wind turbine wheel maintaining alignment between the perimeter and the turbine drive belt. The sprockets can be a single wheel or wheel sprocket 40 or multiple wheels or sprockets 58.

Figure 6:
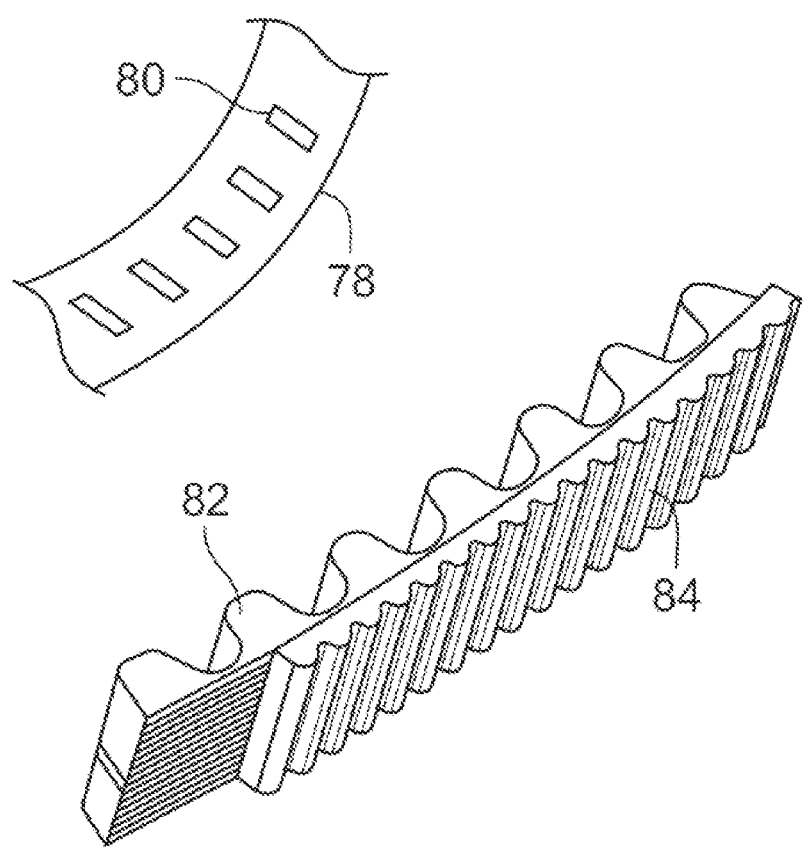

In one embodiment shown in FIG. 6, the turbine wheel perimeter 78 can include wheel openings 80 to receive belt teeth 82 that can be disposed on a perimeter of belt 84. In this embodiment, the teeth of the belt can be disposed on the exterior side of the belt and can be received by the wheel openings in the wind turbine wheel. The belt 60 (best shown in FIGS. 2A and 2B) can include teeth on the interior side that can engage with openings on the sprocket such as inner sprocket 62. Turbine drive belt 60 can include teeth on the outer side or openings to receive teeth on the perimeter. Referring to FIG. 2B, the wind turbine wheel can include a friction or smooth wheel surface 86 that can engage with a friction surface 91, or belt pads 93 or smooth surface 89 of the turbine drive belt.

The vertical idler 36 can be carried by the tower or generator support by idler support 64. The idler support can include a vertical idler axle 66 to maintain a downward force on the bottom portion of the belt. The vertical idler can cause the upper portion of the turbine drive belt to be forced against the turbine wheel perimeter to improve the transfer of rotational force from the turbine wheel to the generator.

Figure 3A:
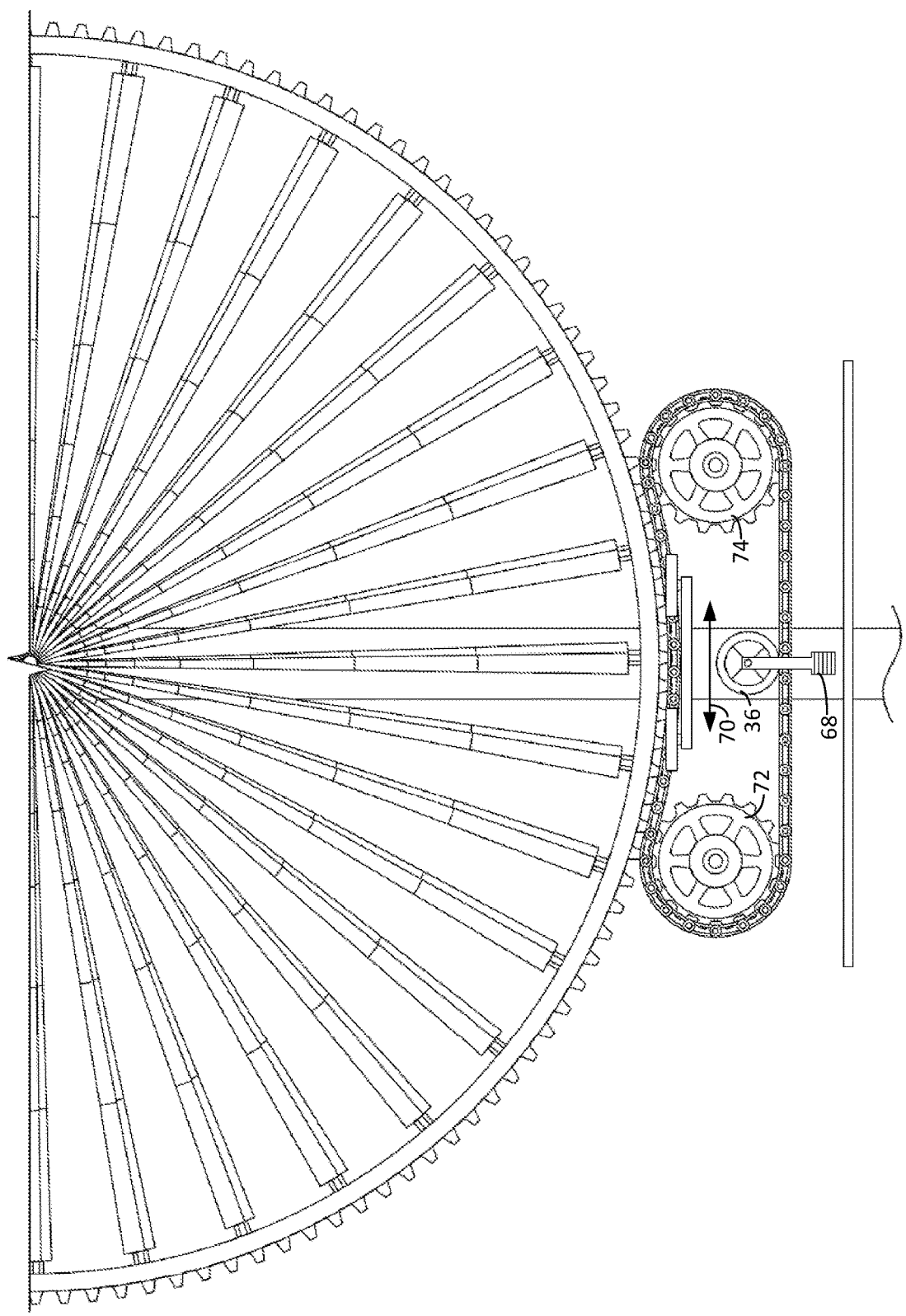
FIG. 3A is a front view of aspects of the system.

Referring to FIGS. 3A and 3B, the vertical idler 36 can be free floating on the turbine drive belt with a weight 68 applying downward force on the bottom portion of the belt. In this embodiment, the vertical idler can move along the bottom portion of the belt in direction 70. A biasing member 88 can also be connected between the vertical idler and the generator support forcing the vertical idler downward.

Figure 4A:
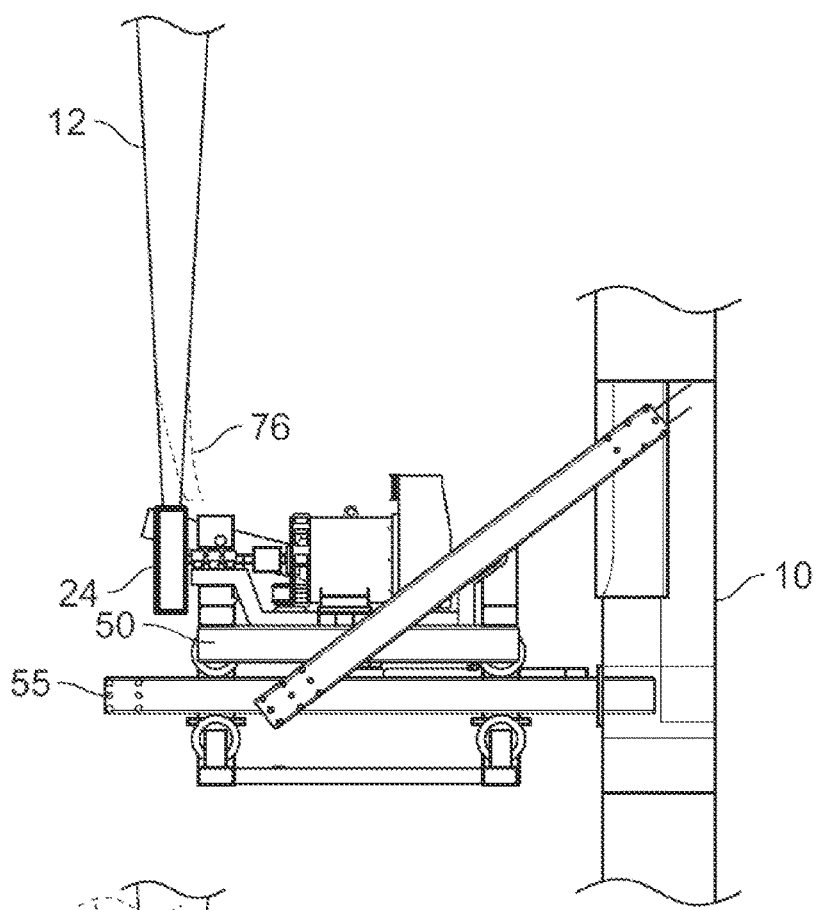
FIG. 4A is a side view of aspects of the system.
Figure 4B:
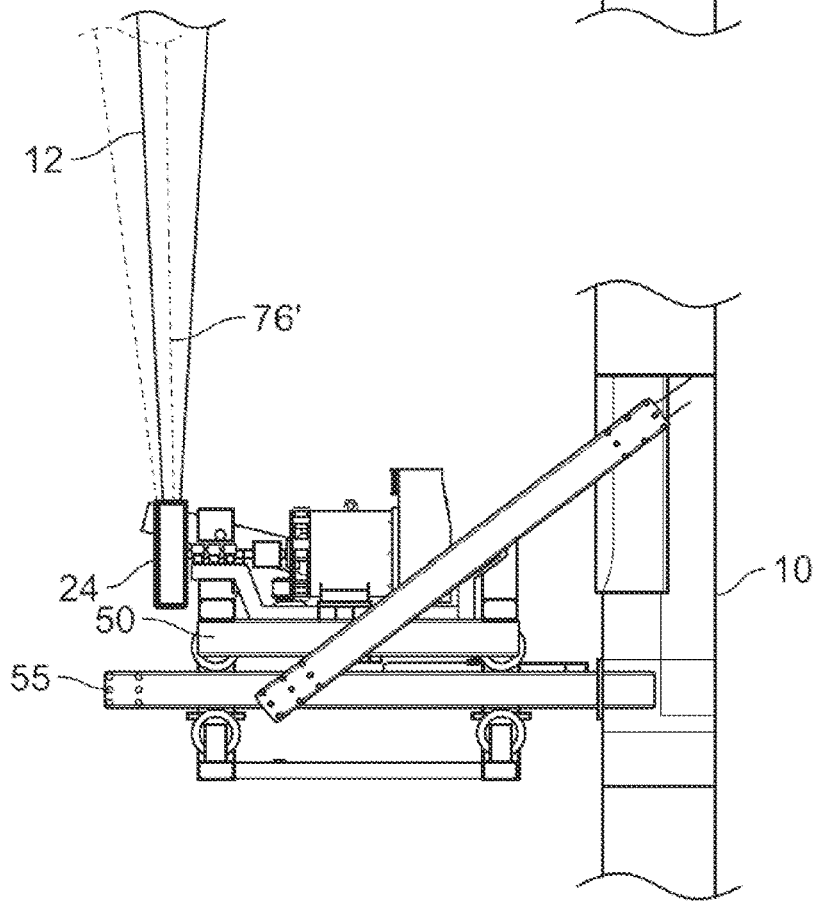
FIG. 4B is a side view of aspects of the system.

Referring to FIGS. 4A and 4B, the wind turbine wheel 12 engages turbine drive belt 24. Forces on the wind turbine wheel can cause the wind turbine wheel to move off a vertical plane in position 76 or 76'. In the event that the generators were statically carried on a generator platform attached to the tower, the turbine drive belt and turbine wheel perimeter may disengage causing multiple disadvantages and even mechanical failures. The generators can be supported by a carriage platform or support 50 that can be slideably carried by a rail assembly 55 so that when the wind turbine wheel moves to off a vertical plane, the generators and turbine drive belt can travel along the rails of the rail assembly keeping the turbine wheel perimeter aligned with the turbine drive belt.

The perimeter can engage with one or more sets of generators. A generator set can include a generator, two generators, a sprocket idler or any combination. The wind turbine wheel can then power one or more generators. In one configuration, sprocket 72 is connected to a generator. Sprocket idler 74 turns freely and is not connected to a generator. This allows the belt system to be used with only one generator. The carriage can also move vertically when the rails are curved so that the belt and the perimeter maintain the same distance and planal orientation as the wind turbine wheel moves off vertical plane.

Figure 5:
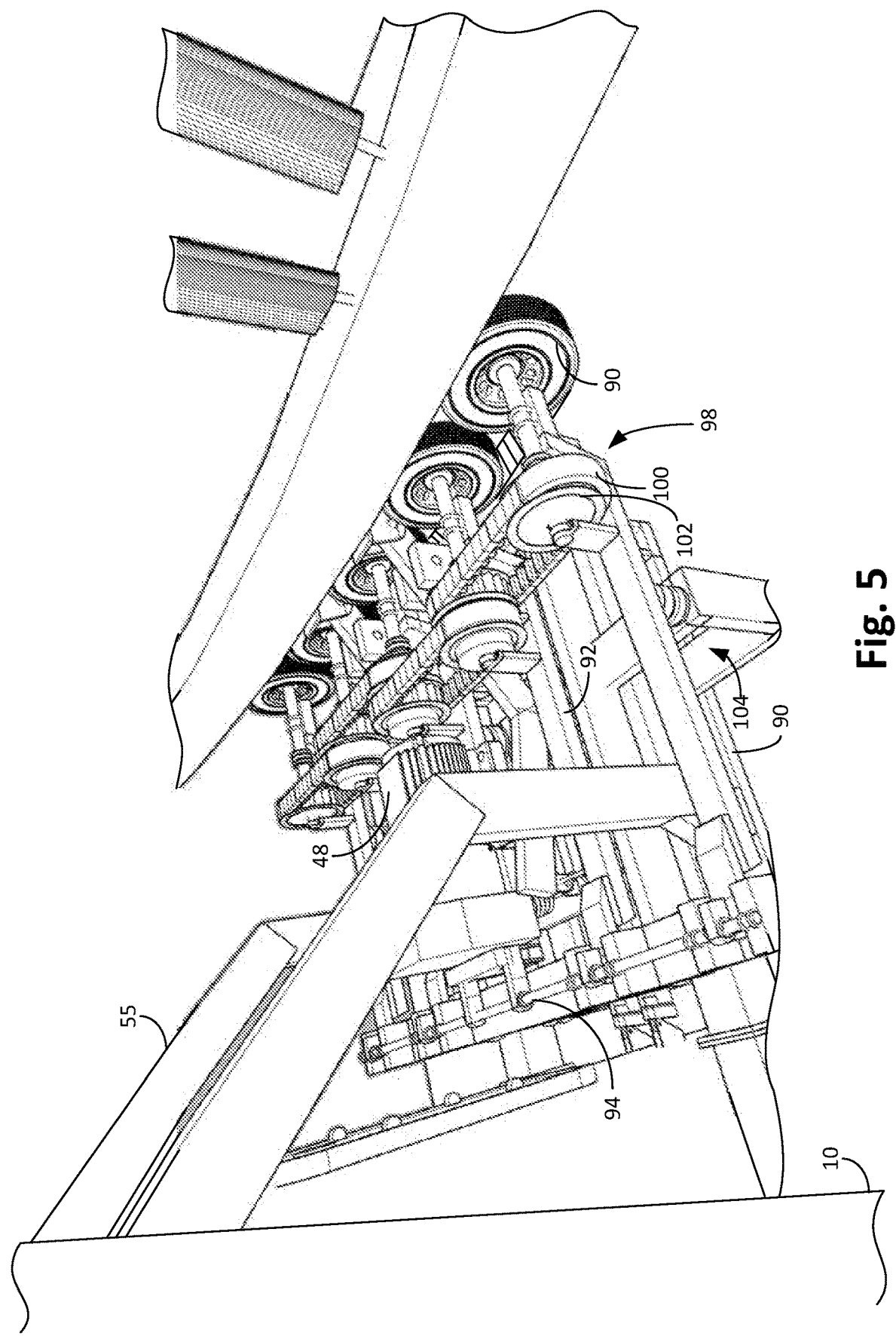
FIG. 5 is a perspective view of aspects of the system; and,
FIG. 6 is a perspective view of aspects of the system.

Referring to FIG. 5, the rail assembly 55 can be attached to the tower 10. A generator support 90 can include a generator platform 92 that can support a generator 48. The generator can be hingeably carried by the generator platform or generator carriage at a pivot 94. The pivot allows the turbine drive belt to engage and disengage to and from the wind turbine wheel. One or more wheels or sprockets 40 can carry he turbine drive belt. In one embodiment, the wheels can be included in a wheel assembly 98 that can include connection belts 100 to transfer rotational force from the wind turbine wheel to the generator. The wheel assembly can include connection gears 102 adapted to transfer rotational force from one or more wheels or sprockets to the generator. A generator lift 104 can support the generator platform and can include a raised position and a lowered position. In the raised position, the turbine drive belt can engage with the perimeter of the wind turbine wheel. In the lowered position the turbine drive belt can disengage from the perimeter of the wind turbine wheel. The generator lift can be adapted to cause the generator platform or support to pivot about pivot 94.

It will be understood by those skilled in the art that one or more aspects of this system can meet certain objectives, while one or more other aspects can meet certain other objectives. Each objective may not apply equally, in all its respects, to every aspect of this system. As such, the description can be viewed in the alternative with respect to any one aspect of this system. These features of the system will become more fully apparent when the following detailed description is read in conjunction with the accompanying figures and examples. However, it is to be understood that both the foregoing summary of the system and the following detailed description are of a preferred embodiment and not restrictive of the system or other alternate embodiments of the system. In particular, while the system is described herein with reference to a number of specific embodiments, it will be appreciated that the description is illustrative of the system and is not constructed as limiting of the system. Various modifications and applications may occur to those who are skilled in the art, without departing from the spirit and the scope of the system, as described by the appended claims. Likewise, other objects, features, benefits, and advantages of the present system will be apparent from this description and will be readily apparent to those skilled in the art. Such objects, features, benefits, and advantages will be apparent from the above in conjunction with the accompanying examples, data, figures, and all reasonable inferences to be drawn therefrom, alone, or with consideration of the references incorporated herein.

Unless specifically stated, terms, and phrases used in this description, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the description may be described or claimed in the singular, the plural is contemplated to be within the scope thereof unless limitation to the singular is explicitly stated. The presence of broadening words and phrases such as "one or more," "at least," "but not limited to" or other like phrases, in some instances, shall not be read to mean that the narrower case is intended or required in instances where such broadening phrases may be absent.

While the present subject matter has been described in detail with respect to specific exemplary examples thereof, it will be appreciated that those skilled in the art, upon attaining an understanding of the foregoing, may readily produce alterations to, variations of, and equivalents to such examples. Accordingly, the scope of the present description is by way of example rather than by way of limitation, and the subject description does not preclude inclusion of such modifications, variations and/or additions to the present subject matter as would be readily apparent to one of ordinary skill in the art using the teachings herein.

What is claimed is:

1. A belt drive system for a wind turbine generator comprising:
    a wind turbine wheel rotatably carried by a tower;
    a generator carried by said tower;
    a drive sprocket operatively associated with said generator to cause said generator to produce power when said drive sprocket rotates, wherein said drive sprocket is disposed adjacent said wind turbine wheel; and,
    a turbine drive belt passing between said wind turbine wheel and said drive sprocket so that an exterior side of said turbine drive belt engages said wind turbine wheel and an interior side of said turbine drive belt engages said drive sprocket, wherein a portion of said drive belt engaging said drive sprocket is simultaneously engaging said wind turbine wheel on the opposite said exterior side of said drive belt to transfer rotational energy from said wind turbine wheel to said drive sprocket to cause said generator to generate electricity.

2. The belt drive system of claim 1 including teeth disposed along a perimeter of said wind turbine wheel engaging with belt openings defined in said turbine drive belt.

3. The belt drive system of claim 1 including teeth disposed along a perimeter of said turbine drive belt engaging with wheel openings defined in said wind turbine wheel.

4. The belt drive system of claim 1 including a generator platform slidably attached to said tower and carrying said generator, wherein said generator platform is slidable toward and away from said tower.

5. The belt drive system of claim 4 including a rail assembly attached to said tower and slideably attached to said generator platform and adapted to allow said turbine drive belt to move toward or away from said tower in concert with lateral movement of said wind turbine wheel.

6. The belt drive system of claim 4 including a generator carriage hingeably attached to said generator platform; and,
    a generator lift supporting said generator carriage having a raised position and a lowered position, wherein in said raised position the turbine drive belt engages with a perimeter of said wind turbine wheel, and wherein in said lowered position said turbine drive belt is disengaged from said perimeter of said wind turbine wheel.

7. The belt drive system of claim 1 including a vertical idler engaging said interior side of said turbine drive belt to tension said turbine drive belt.

8. The belt drive system of claim 7 including a horizontal idler engaging a side surface of said turbine drive belt to maintain a position of said turbine drive belt between said wind turbine wheel and said drive sprocket.

9. The belt drive system of claim 1 wherein said turbine drive belt includes teeth on an interior side engaging complementary grooves in said drive sprocket.

10. A belt drive system for a wind turbine generator comprising:
    a wind turbine wheel rotatably attached to a support structure, wherein said wind turbine wheel has a continuous circular perimeter surface;
    a first generator and a second generator carried on said support structure, wherein said first and second generators each include a drive sprocket; and,
    a turbine drive belt engaging with said perimeter surface of said wind turbine wheel along an exterior side of said turbine drive belt and an interior side of said turbine drive belt engaging said drive sprocket for each of said first and second generators, wherein each of said drive sprockets is operatively associated with one of said first and second said generators to transfer rotational energy from said wind turbine wheel to said said first and second generators to generate electricity.

11. The belt drive system of claim 10 including teeth disposed along said perimeter surface of said wind turbine wheel engaging with belt openings defined in said turbine drive belt.

12. The belt drive system of claim 10 including teeth disposed along a perimeter of said turbine drive belt engaging with wheel openings defined in said wind turbine wheel.

13. The belt drive system of claim 10 including a generator platform carrying said generator, wherein said generator platform is slidably carried on said support structure to adjust a position of said generator platform relative to movement of said wind turbine wheel.

14. The belt drive system of claim 10 including a horizontal idler engaging a side surface of said turbine drive belt to maintain engagement of said turbine drive belt with said wind turbine wheel and said drive sprocket.

15. The belt drive system of claim 10 including teeth disposed along said exterior side of said turbine drive belt engaging with wheel openings defined in said perimeter surface of said wind turbine wheel.

16. The belt drive system of claim 10 including teeth disposed along said perimeter surface of said wind turbine wheel engaging with belt openings defined in said turbine drive belt.

17. The belt drive system of claim 10 including a generator lift supporting said generators having a raised position and a lowered position, wherein in said raised position said turbine drive belt engages with said perimeter surface of said wind turbine wheel and, wherein in said lowered position said turbine drive belt is disengaged from said perimeter surface of said wind turbine wheel.

18. A belt drive system for a wind turbine generator comprising:
   a tower;
   a wind turbine wheel rotatably carried by the tower;
   a generator platform slidably carried on said tower to allow said generator platform to adjust a position of said generator platform relative to movement of said wind turbine wheel;
   a generator carried by the generator platform; and,
   a turbine drive belt engaging said wind turbine wheel along an exterior side of said turbine drive belt and engaging with a drive sprocket operatively associated with said generator along an interior side of said turbine drive belt, wherein a portion of said drive belt engaging said drive sprocket is simultaneously engaging said wind turbine wheel on the opposite said exterior side of said drive belt to transfer rotational energy from said wind turbine wheel to said drive sprocket to cause said generator to generate electricity.

19. The belt drive system of claim 18 including a generator lift supporting said generator platform having a raised position and a lowered position, wherein in said raised position said turbine drive belt engages with said perimeter surface of said wind turbine wheel and, wherein in said lowered position said turbine drive belt is disengaged from said perimeter surface of said wind turbine wheel.

\* \* \* \* \*